US012547442B2

(12) United States Patent
Al-Maamari et al.

(10) Patent No.: US 12,547,442 B2
(45) Date of Patent: Feb. 10, 2026

(54) AD-HOC PROXY FOR BATCH PROCESSING TASK

(71) Applicant: International Business Machines Corporation, Armonk, NY (US)

(72) Inventors: Tareq Al-Maamari, Boeblingen (DE); Klaus Rindtorff, Böblingen (DE); Andreas Arning, Boeblingen (DE); Heinz Peter Hippenstiel, Boeblingen (DE); Raiko Nitzsche, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 17/526,875

(22) Filed: Nov. 15, 2021

(65) Prior Publication Data

US 2023/0153147 A1 May 18, 2023

(51) Int. Cl.
*H04L 9/40* (2022.01)
*G06F 9/48* (2006.01)

(52) U.S. Cl.
CPC .......... *G06F 9/48* (2013.01); *H04L 63/0272* (2013.01); *H04L 63/0281* (2013.01); *H04L 63/08* (2013.01)

(58) Field of Classification Search
CPC .. G06F 9/48; G06F 2209/5017; G06F 9/5027; G06F 9/46; G06F 9/50; G06F 9/54; H04L 63/08; H04L 63/0272; H04L 63/0281
See application file for complete search history.

(56) References Cited

U.S. PATENT DOCUMENTS

| | | | |
|---|---|---|---|
| 7,650,331 B1 | 1/2010 | Dean et al. | |
| 8,997,107 B2 | 3/2015 | Jain | |
| 9,218,405 B2 | 12/2015 | Baumgarten et al. | |
| 9,413,756 B1 | 8/2016 | Wang | |
| 11,403,294 B1* | 8/2022 | Aya | G06F 16/2255 |
| 11,470,048 B1* | 10/2022 | Surkatty | G06F 9/45558 |
| 2010/0162245 A1* | 6/2010 | Plancarte | G06F 9/4843 718/101 |
| 2016/0088326 A1 | 3/2016 | Solomon et al. | |

(Continued)

FOREIGN PATENT DOCUMENTS

TW          I594131 B          8/2017

OTHER PUBLICATIONS

Tian et al., DiNoDB: An Interactive-speed Query Engine for Ad-hoc Queries on Temporary Data, IEEE Transactions on Big Data (vol. 3, Issue: 3, Sep. 1, 2017).

*Primary Examiner* — Kevin L Young
(74) *Attorney, Agent, or Firm* — CHIP LAW GROUP

(57) ABSTRACT

Provided is an ad-hoc proxy for a batch processing task within a cloud environment. The proxy may reduce overhead that results from authentication between a jobs of the processing task and a third-party service. An example operation may include one or more of dividing a processing task for a target service into a plurality of jobs that each access data from the target service, establishing an authenticated communication channel between one or more proxies on a host platform and the target service, executing, via the one or more proxies, the plurality of jobs in parallel and accessing data from the target service via the authenticated communication channel established between the one or more proxies and the target service, and returning results of the execution to the plurality of jobs.

19 Claims, 8 Drawing Sheets

(56) References Cited

U.S. PATENT DOCUMENTS

| | | |
|---|---|---|
| 2017/0185448 A1* | 6/2017 | Tao ........................ H04L 67/63 |
| 2018/0074855 A1 | 3/2018 | Kambatla |
| 2019/0130328 A1 | 5/2019 | Shukla et al. |
| 2020/0065502 A1* | 2/2020 | Lockman .............. G06F 9/4806 |
| 2020/0186355 A1 | 6/2020 | Davies |
| 2020/0348712 A1* | 11/2020 | Schern ..................... F16P 1/00 |
| 2021/0004163 A1* | 1/2021 | Xu ........................ G06F 9/4881 |
| 2021/0064503 A1* | 3/2021 | Dageville ........... G06F 11/3409 |

* cited by examiner

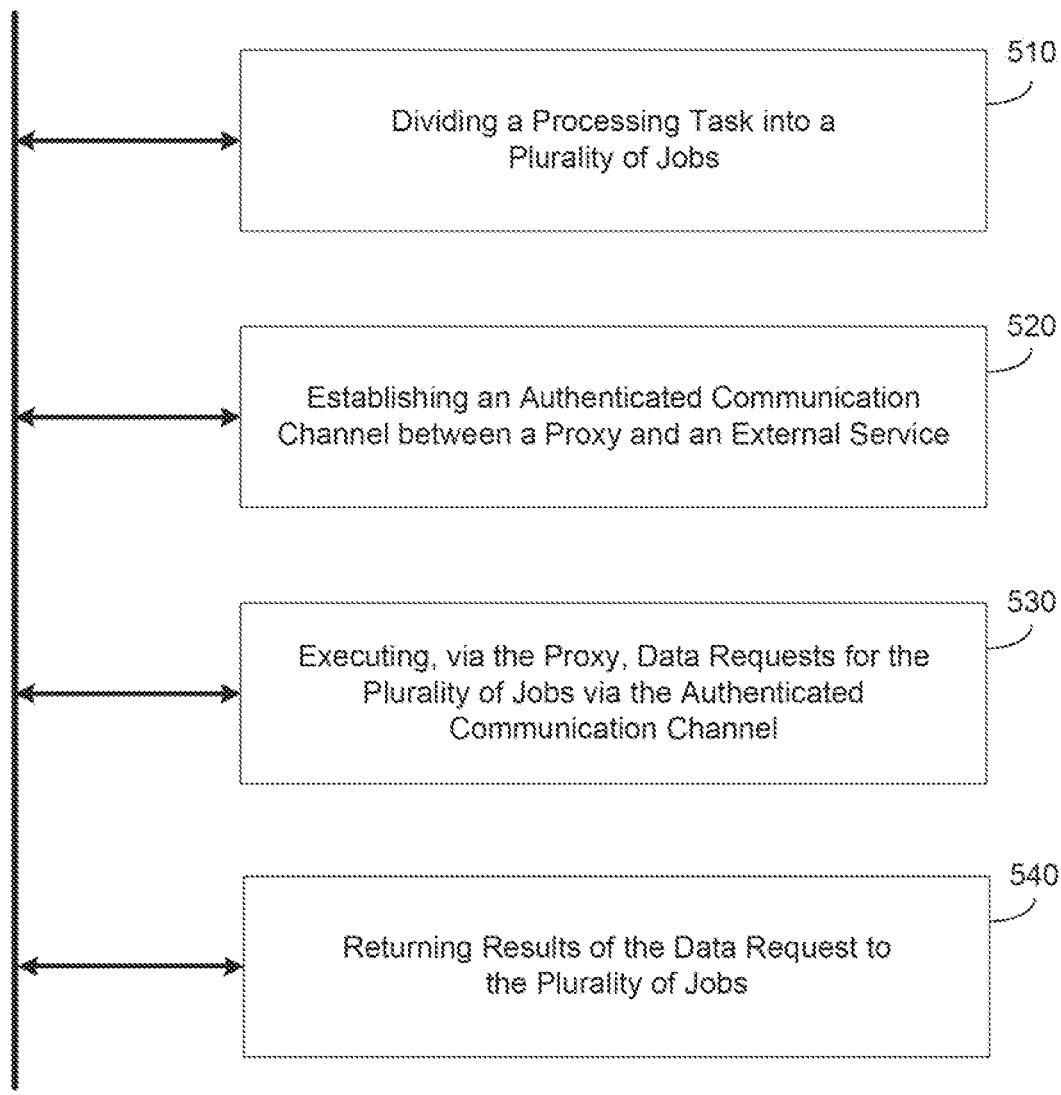

AD-HOC PROXY FOR BATCH PROCESSING TASK

BACKGROUND

In a cloud environment, such as scale-to-zero platforms, distributed workloads are highly scalable. For example, a distributed workload can be scaled to zero if resources are no longer needed. Likewise, a distributed workload can be scaled-up in matter of milliseconds, if necessary. Recently, batch processing has been introduced to exploit the power of such platforms and to achieve high performance computing. Batch processing divides a processing task into a plurality of smaller sub-tasks (i.e., jobs) which can be executed in parallel in the cloud in a shorter time. Furthermore, batch processing tasks can be scaled up or down by the cloud based on the amount of work that needs to be performed. For example, additional job instances can be added or taken away depending on the resources of the cloud platform.

In large public cloud environments, hundreds of batch processing tasks can be running at a given time. Here, each batch processing task is designed to run once, perform a processing task, and then exit. A common scenario for batch processing is when an application or other program requires the transfer of data to or from a third-party service such as a remote storage. For example, videos, documents, images, audios, files, etc., may be retrieved from a third-party service via a batch processing task. In this case, the third-party service typically requires the plurality of jobs to be authenticated with the third-party service prior to any data being downloaded. This authentication creates overhead for subsequent messages passed between the jobs and the third-party service which can slow down the overall throughput of the batch processing task. Accordingly, what is needed is a mechanism for improving the efficiency of batch processing in the cloud.

SUMMARY

One example embodiment provides an apparatus that includes a processor configured to one or more of divide a processing task for a target service into a plurality of jobs that each access data from the target service, establish an authenticated communication channel between one or more proxies on a host platform and the target service, execute, via the one or more proxies, the plurality of jobs in parallel and access data from the target service via the authenticated communication channel established between the one or more proxies and the target service, and return results of the execution to the plurality of jobs.

Another example embodiment provides a method that includes one or more of dividing a processing task for a target service into a plurality of jobs that each access data from the target service, establishing an authenticated communication channel between one or more proxies on a host platform and the target service, executing, via the one or more proxies, the plurality of jobs in parallel and accessing data from the target service via the authenticated communication channel established between the one or more proxies and the target service, and return results of the execution to the plurality of jobs.

A further example embodiment provides a non-transitory computer-readable medium comprising instructions, that when read by a processor, cause the processor to perform one or more of dividing a processing task into a plurality of jobs and executing the plurality of jobs in parallel on a host platform, establishing an authenticated communication channel between a proxy of the host platform and a service that needs authentication, executing, via the proxy, data requests for the plurality of jobs via the authenticated communication channel between the proxy and the service, and returning results of the executed data requests to the plurality of jobs.

BRIEF DESCRIPTION OF THE DRAWINGS

FIG. 5 is a diagram illustrating a method of processing a task via an ad-hoc proxy according to example embodiments.

DETAILED DESCRIPTION

Figure 1:
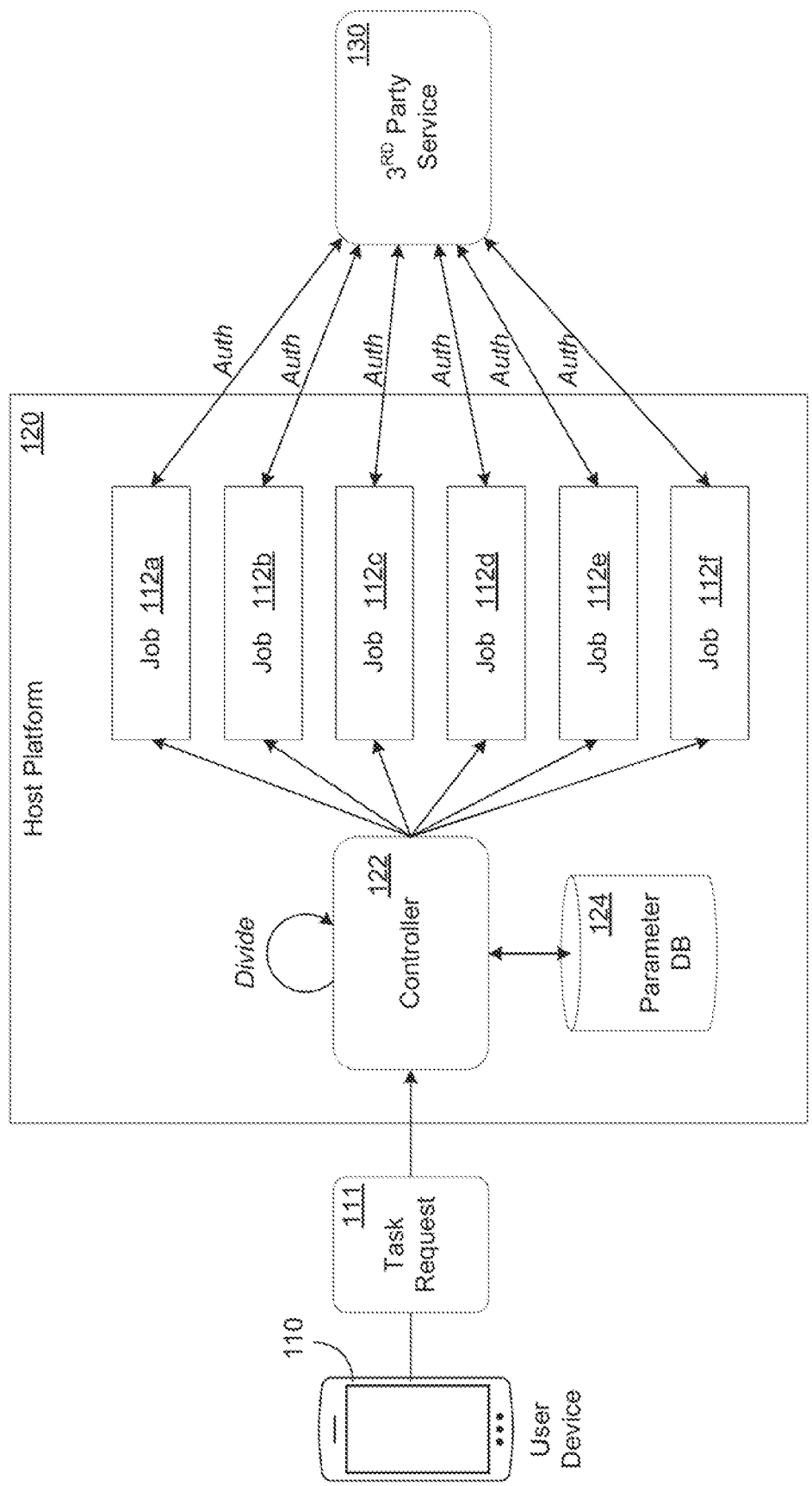
FIG. 1 is a diagram illustrating a process of dividing a processing task into a plurality of jobs that access a third-party service directly.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer-readable media, devices, and/or networks, which are directed to a proxy that reduces overhead between a processing task on a cloud platform and a third-party service (such as an external storage system) caused by authentication thereby improving overall throughput of the processing task. The proxy may be referred to as an "ad-hoc proxy" because the proxy may be created dynamically, in response to a task request and may be terminated when the processing task is completed.

As described herein, a processing task refers to an overall task to be performed. Examples of processing tasks including querying a data store for data and processing the queried data to generate a processing result. Processing tasks may be performed for various activities in the cloud including generating reports, running payroll, acquiring data for training a machine learning model, and many others. According to various embodiments, a host platform such as a cloud platform may split the processing task into multiple/many subtasks for parallel processing in the cloud. The subtasks may be referred to herein as "jobs" or "job instances". A cloud provider may provide an application programming interface (API) or other interface capable of receiving task requests for a processing task. Here, the task requests may be transmitted from a user, user interface, software process, etc. In response to receipt of a task request, the cloud provider may identify the task and create a plurality smaller tasks (jobs) which are then launched in the cloud.

In some embodiments, the task may include a batch processing task. Batch processing is often used for high-volume, repetitive tasks. Batch tasks may run asynchronously (i.e., simultaneously) without a user interaction and can be scheduled to run as resources permit. For example, a program that reads a large file and generates a report is often considered a batch task. Unlike application instances, batch tasks are meant to be executed only once, perform a particular processing task, and then exit. Furthermore, batch tasks can be scaled up or scaled down as the resources permit. For example, additional job instances can be added or removed when the system has them available to satisfy a processing threshold such as a number of data records to be queried in a given period of time, and the like.

As an example, a batch processing task may be performed when interacting with a third-party service/service provider that provides technology that is used by an application, a service, a program, etc. Third-party services, as described herein, refer to organizations that provide resources (memory, processing capabilities, software functions, etc.) that may be used to store, process, and/or transmit data that enhances an operation of an organization, application, or the like, within the cloud environment. For example, the third-party service may be a "target" service that needs or requests authentication before operations can be performed. In some embodiments, the third-party services may be remote/external with respect to the cloud platform where the batch processing is being performed. As another example, the third-party services may be hosted on the cloud platform but may be isolated from the batch processing. Third-party services often require an authentication to be performed between the software process that is requesting data and the third-party service.

In some embodiments, each job instance of a batch processing task may be programmed to perform the same repeatable functions for the batch processing task. For example, when a processing task requires a video to be downloaded from a third-party service, each job may be responsible for functions such as downloading a small portion of the video, extracting data, processing the extracted data, and uploading the processed data back to the third-party service. With each of the jobs being run in parallel, it is possible to download the video much faster than when downloading the file as one large processing task (i.e., without parallelism).

In the example of downloading video, each job instance must typically authenticate itself with the third-party service prior to data being provided from the third-party service to the job instance. This requires the job to be programmed with authentication credentials for the third-party service and to perform an authentication process with the third-party service to establish an authenticated session. These authentication steps require additional messaging, resources, and time, which slows down the overall throughput of the host platform.

The example embodiments overcome the deficiencies of conventional batch processing within a cloud environment. The ad-hoc proxy described herein may reduce the overhead of repeatable authentication operations done by short-living jobs of a batch processing task which interact with third-party services. The ad-hoc proxy may also be short-living and may perform a function of an intermediate proxy that is part of the batch processing task and sits in between the job instances on the host platform and the third-party services. For example, the ad-hoc proxy may be provided or otherwise deployed from a binary file, a software process, a data container, an instruction, or the like.

The ad-hoc proxy can handle the needed authentication operations on behalf of the job instances with the third-party service thereby obviating the need for the job instances to each perform such authentication steps. Furthermore, the ad-hoc proxy and the job instances can be isolated together on a private network on the host platform thereby obviating the need for authentication steps to be performed between the job instances and the ad-hoc proxy.

According to various embodiments, the authentication process only needs to be performed once (i.e., between the ad-hoc proxy and the third-party service) and not many times (e.g., between each job and the third-party service, etc.) Thus, the example embodiments can reduce overhead within a batch processing task by removing authentication operations of smaller short-living subtasks of the batch processing task, thereby improving throughput of the host platform when processing the batch processing task.

There are two main approaches for inputting data to a batch processing task. In a first approach, a first job instance acts as a master job, pulls the data from the third-party service, split it into chunks, and feeds the chunks of data to the other jobs. In a second approach, each job instance pulls its own data and processes the data accordingly. The example embodiments are directed to an improvement for the second approach where each job instance pulls data from the third-party service an performs repeatable operations on the data.

In particular, each job instance may include a sequence of functions that are identical as the other job instances, for example, downloading data, extracting data, modifying/ processing data, writing data, etc. The batch processing task may be split into tens or even hundreds of jobs. In some embodiments, the ad-hoc proxy associated with the batch processing task may be created after the jobs have been created. As another example, the ad-hoc proxy may be created before the jobs are created. Here, the ad-hoc proxy may be created and deployed by the host platform in response to a task request. During or after creation, the ad-hoc proxy may be programmed with credentials of the third-party service and may perform a one-time authentication with the third-party service that lives for the remainder of the session of the batch processing task. The plurality of jobs of the batch processing task may then exclusively communicate with the third-party service through the ad-hoc proxy. Once the batch processing task is finished, the ad-hoc proxy is terminated. Furthermore, the plurality of jobs and the ad-hoc proxy may be isolated by the host platform within a virtual private network (VPN). In doing so, it is not necessary for the jobs to authenticate themselves with the ad-hoc proxy, since they have previously registered with the private network.

FIG. 1 illustrates a process 100 of dividing a processing task into a plurality of jobs that access a third-party service 130 directly, according to example embodiments. Referring to FIG. 1, a user device 110 (e.g., desktop computer, tablet, mobile phone, server, database, etc.) may submit a task request 111 which identifies a processing task that is to be performed by a host platform 120 (e.g., a cloud platform, a web server, a database node, etc.). Here, the task request 111 may include parameters that are different from one implementation to another. In general, there are two types of parameters of a processing task including user-provided parameters such as processing logic, storage location of input data, number of jobs/subtasks the task should be divided into, and the like, and system parameters such as where to run the task/jobs, and the like. A cloud provider may receive the task request 111 through a deployment manifest that is provided by the user device 110. As another example, the task request 111 may constructed from a command line interface, or the like. Once the task request 111 is submitted, the parameters in the task request 111 may be stored by the host platform 120 in a secure database such as a parameter database 124.

In this example, a controller 122 of the host platform 120 divides the task into a plurality of jobs 112a, 112b, 112c, 112d, 112e, and 112f. Each job from among the jobs 112a-112f may be programmed to perform the same set of functions, for example, downloading data, extracting data from the downloaded data, processing the extracted data, uploading the processed data, etc. The individual functions performed by the jobs 112a-112f may be different depending on the type of task included in the task request 111. Also, the number of jobs 112a-112f may be configurable/scaled by either the submitter (user device 110) and the host platform 120. For example, the host platform 120 may scale up or scale down the number of job instances depending on the available resources of the host platform 120.

In the example of FIG. 1, the task is a task to download video data from the third-party service 130, which may include a third-party database, data store, etc., or some other kind of service. The third-party service 130 requires an authentication to be performed before data download. In this example, each of the plurality of jobs 112a-112f must establish an authenticated session with the third-party service 130 before the data can be retrieved. Therefore, six separate authentications must be performed for the six jobs 112a-112f. The authentication may be performed based on signatures, keys, session IDs, MACs, etc. Furthermore, additional communications throughout the batch processing session must include session information which provide evidence of the previously performed authentication. For example, the session information may include signatures, keys, session IDs, MACs, etc. that are used for purposes of verifying the respective authentications were performed. This overhead consumes resources of the host platform 120 thereby slowing down the overall throughput of the system.

Figure 2:
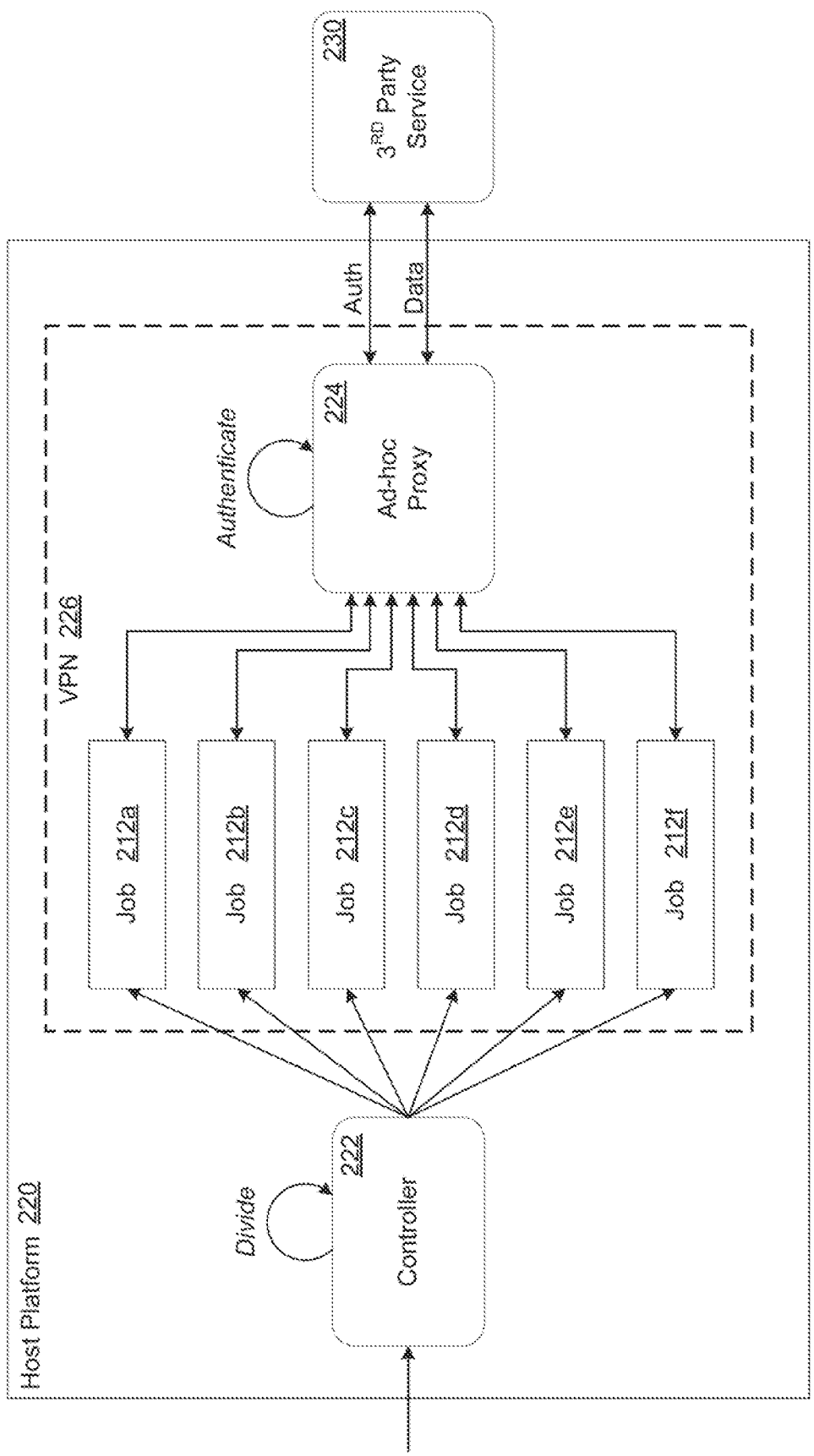
FIG. 2 is a diagram illustrating a process of dividing a processing task into a plurality of jobs that access a third-party service via an ad-hoc proxy, according to example embodiments.

FIG. 2 illustrates a process 200 of dividing a processing task into a plurality of jobs that access a third-party service 230 via an ad-hoc proxy, according to example embodiments. As an example, the "accessing" of data may refer to downloading data, reading data, uploading data, writing data, modifying data, and the like. In the example of FIG. 2, the plurality of jobs are pulling data from the third-party service 230 and then uploading response data to the third-party service 230, but other data access operations are also possible.

Referring to FIG. 2, in response to receiving a task request (not shown), a controller 222 of a host platform 220 identifies a task associated with the task request and splits the task into a plurality of jobs 212a, 212b, 212c, 212d, 212e, and 212f that are executed on the host platform 220 at the same time (i.e., simultaneously) with each other. That is, each of the plurality of jobs 212a-212f may have overlapping execution times. In some embodiments, the plurality of jobs 212a-212f may be distributed among a plurality of virtual machines, nodes, cores, etc. of the host platform 220 for improved parallelism.

In the example of FIG. 2, as is the case of FIG. 1, each of the jobs 212a-212f may perform the same repeatable operations for the task, such as a read operation from the third-party service 230, a write operation to the third-party service 230, processing functions, and the like. However, unlike in FIG. 1, in this example, the host platform 220 creates an ad-hoc proxy 224 to perform various common functions for each of the plurality of jobs 212a-212f. For example, the common functions may include downloading data, uploading data, reading data, modifying data, and the like. The ad-hoc proxy 224 may be created and deployed in response to the task request for exclusively performing the task included in the task request. The ad-hoc proxy 224 may be a processing node/service capable of passing data to the third-party service 230 and forwarding data back to the plurality of jobs 212a-212f. For example, a cloud provider may create, launch, instantiate, etc. the ad-hoc proxy 224 (or multiple ad-hoc proxies) in response to receiving a task request from a client/user.

The ad-hoc proxy 224 may be programmed with specific instructions to perform a particular function of functions for each of the plurality of jobs 212a-212f, at the same time. For example, the ad-hoc proxy may be programmed (e.g., embedded) with credentials for authenticating with the third-party service 230 including one or more digital signatures, passwords, keys, MACs, and the like. The ad-hoc proxy 224 may also be programmed with attributes such as a location of the input data from the plurality of jobs 212a-212f on the third-party service 230, a network location of the third-party service 230, and the like. Here, the ad-hoc proxy 224 may perform an authentication with the third-party service 230 using any desired authentication protocol of the third-party service 230 to establish an authenticated session with the third-party service 230. Thus, an authenticated communication channel may be established between the ad-hoc proxy 224 and the third-party service 230. The authenticated session may remain for the entirety of the processing task.

During processing of the processing task, each of the plurality of jobs 212a-212f may access the third-party service 230 simultaneously via the ad-hoc proxy 224. For example, requests for data (e.g., read operations, write operations, modify operations, create operations, etc.) may be forwarded from the plurality of jobs 212a-212f to the ad-hoc proxy 224. In response, the ad-hoc proxy 224 may perform the data requests with the third-party service 230 on behalf of the plurality of jobs 212a-212f and return the results to the plurality of jobs 212a-212f. Because the authenticated session between the ad-hoc proxy 224 and the third-party service 230 is present, the plurality of jobs 212a-212f do not need to authenticate themselves with the third-party service 230. Instead, the authenticated session between the ad-hoc proxy 224 and the third-party service 230 can ensure that the task is authorized to perform such data requests.

When the task is completed, the host platform 220 may terminate or otherwise stop execution of the ad-hoc proxy 224. In some embodiments, the ad-hoc proxy 224 may be a simple pass-through service, for example, provided from a template of the cloud provider. Here, the pass-through service may transfer messages/requests from the plurality of jobs 212a-212f to the third-party service 230, and vice versa. As another example, the ad-hoc proxy 224 may be a more sophisticated node which translates request messages from the jobs 212a-212f to the third-party service 230 or even to multiple different external storage/services. The translation may include modifying data types, variable names, table structures, and the like.

Although the example embodiments are described with respect to batch processing tasks in a cloud environment, it should be appreciated that the example embodiments may be applied to any type of parallel processing where a task is split up into subtasks that are processed simultaneously such as data mining, video processing, report generating, accounting, payroll, and the like. The ad-hoc proxy 224 described herein receives parameters of the task at the time of creation including the authentication credentials from the third-party service. The ad-hoc proxy 224 may download data for the plurality of jobs 212a-212f from the third-party service 230. Furthermore, the ad-hoc proxy 224 may deliver output data from the plurality of jobs 212a-212f to the third-party service 230.

In some embodiments, the ad-hoc proxy may only communicate with the third-party service (e.g., the third-party service 230) without being accessible to other programs on the host platform 220. For example, the controller 222 of the host platform 220 may create a virtual private network (VPN) 226 within the host platform 220 that includes the plurality of jobs 212a-212f and the ad-hoc proxy 224 thereby isolating the plurality of jobs 212a-212f and the ad-hoc proxy 224 from other programs on the host platform 220. The VPN 226 may be created for the plurality of jobs 212a-212f prior to launching the ad-hoc proxy 224. Thus, when the ad-hoc proxy 224 is created and instantiated, it can start its execution within the VPN 226.

According to various embodiments, at least one ad-hoc short-living proxy is introduced to handle authentication between a batch processing task and a third-party services (e.g., storage, processing, computing, etc.). Once a new batch processing task is triggered, an initial job may be created by the host platform to setup the ad-hoc proxy and its services as part of a pre-task execution step. The setup includes spawning at least one ad-hoc proxy node. The number of needed proxies depends on different factors. For instance, the host platform and/or the user may determine the number of proxies to implemented based on a size of the batch processing task, data center locations in which jobs of the batch processing task are located, and the like.

In some embodiments, more than one ad hoc proxy may be created by the host platform for the plurality of jobs of a batch processing task. For example, a set of proxies may be created where the set includes one to N proxies. The number of proxies that are created may depend on various attributes, for example, location of a data center where the target service is being accessed, region of the data center, zone of the data center, and the like. Thus, multiple proxies may be created for a single batch processing task and multiple proxies may be used to simultaneously generate authenticated channels with the target service and perform the plurality of jobs in parallel with the target service. It should also be appreciated that the ad hoc proxy may establish authenticated channels with multiple different target services. Here, the ad hoc proxy may simultaneously access data for the plurality of jobs via a plurality of authenticated channels established between the multiple target services, respectively.

When the ad-hoc proxy is up and running, the ad-hoc proxy may authenticate against a third-party service and initialize a new authenticated session that lives as long as the batch processing task lives. Jobs to execute the batch processing task may be spawned subsequently (or simultaneously or prior to) and may interact with the third-party services exclusively through the ad-hoc proxies. Furthermore, both of the jobs and proxies of a batch processing task may be isolated together inside of a virtual private network. Thus, the jobs may not need additional authentication when accessing the ad-hoc proxy, hence, no additional overhead is introduced. When the batch processing task is terminated, all created resources including the jobs, proxies and virtual private network may be terminated and removed from the runtime environment on the host platform.

For example, when the ad-hoc proxy is created, the ad-hoc proxy may be programmed to authenticate with the target service. For example, the ad-hoc proxy may trigger authentication/authorization requests with the target service based on authentication credentials of the target service that are embedded in the ad-hoc proxy at the time of creation or thereafter. Once authenticated, the ad-hoc proxy may begin pulling data from the target service and hold the data in a storage. The plurality of jobs may also begin pulling data from the ad-hoc proxy. Here, the plurality of jobs may request to pull the data from the ad-hoc proxy on a continual and/or periodic basis until the data is transferred or until the jobs are timed out.

A batch processing task is typically divided into a set of repetitive sub-tasks (jobs). In the example embodiments, the jobs are extended to introduce an ad-hoc proxy to the batch processing task. The ad-hoc proxy may be a standalone software program, service, process, application, etc., that is part of the processing task and that lives and dies with the task. Furthermore, the ad-hoc proxy is restricted in its abilities to communicate, for example, to the individual jobs and the third-party service only. By introducing the communication limitations, the deployment in the cloud may be secure. For example, the ad-hoc proxy may be a "stealth node", meaning that the node is secured by keeping it invisible and inaccessible within the cloud and not allowing the node to communicate with any other endpoints except the designated external storage (e.g., third-party storage, etc.)

Figure 3A:
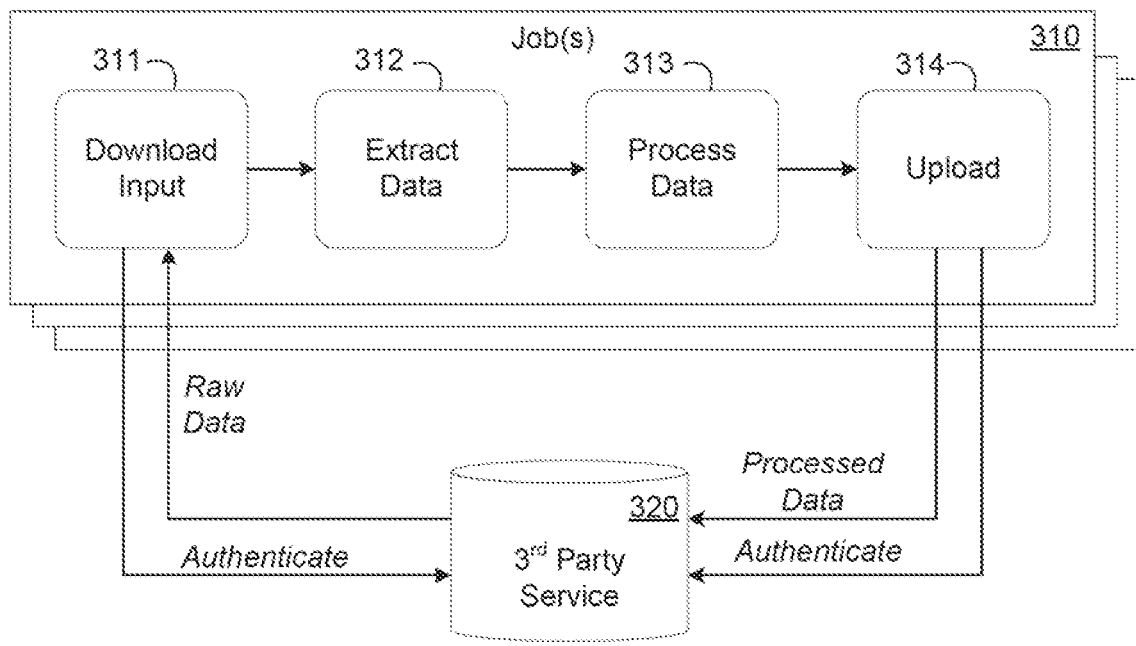
FIG. 3A is a diagram illustrating a process of a job instance accessing a third-party service directly.
Figure 3B:
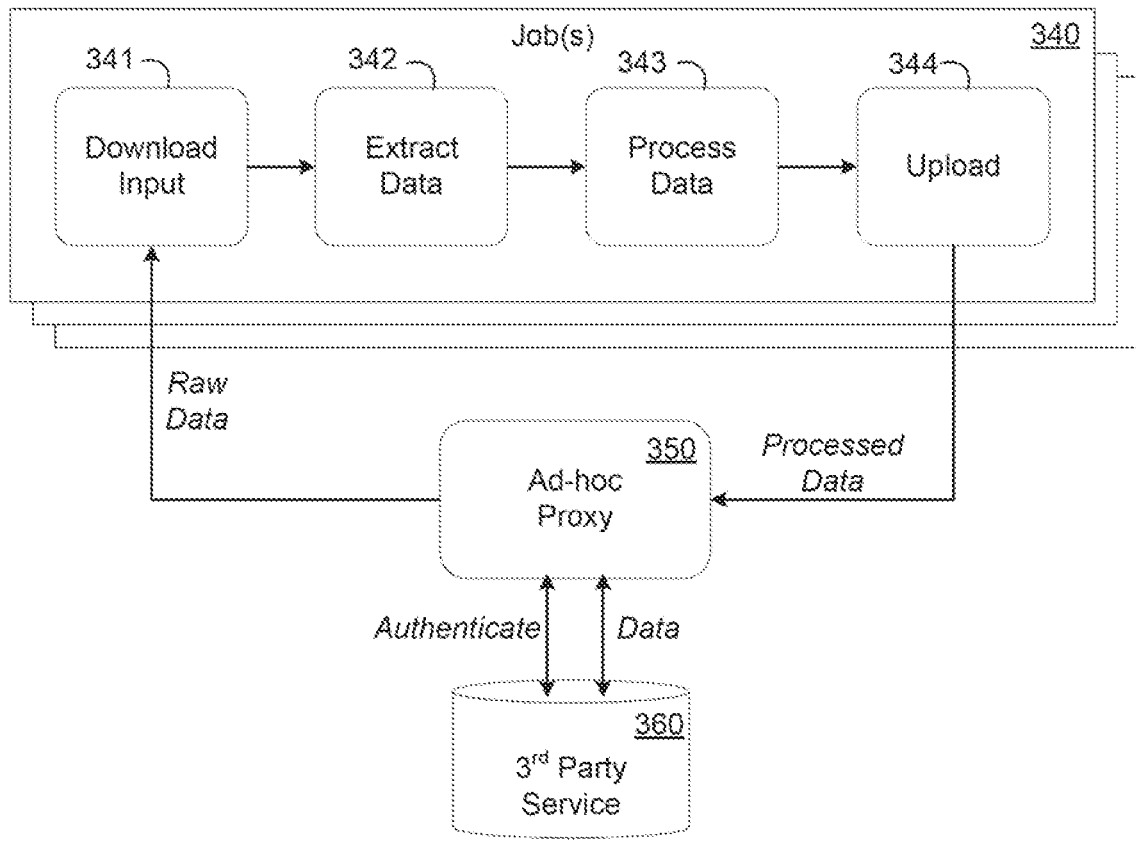
FIG. 3B is a diagram illustrating a process of a job instance accessing a third-party service via a proxy according to example embodiments.

FIG. 3A illustrates a process 300 of a job 310 accessing a third-party service 320 directly according to example embodiments, and FIG. 3B illustrates a process 330 of a job 340 accessing a third-party service 360 via an ad-hoc proxy 350 according to example embodiments. Referring to FIG. 3A, a processing task may be divided into a plurality of jobs 310. Here, only one instance of the job 310 is shown, but it should be appreciated that multiple instances of the job 310 may be implemented for performing a processing task. Each job 310 may perform the same operations with respect to the third-party service 320. For example, the operations may include download input data 311, extract data 312, process the extracted data 313, and upload the processed data 314. In this case, the jobs 310 may have different operations depending on the processing task. In each example though, the jobs 310 may be configured to perform the same operations.

In FIG. 3A, the job 310 must authenticate itself with the third-party service 320 before input data can be downloaded. For example, if one hundred (100) instances of the job 310 exist, then one hundred (100) authentications must be performed, one for each instance of the job 310. After the authentication, the job 310 may perform its duties.

Referring now to FIG. 3B, a processing task may be divided into a plurality of jobs 340, with only one instance of the job 340 being shown for brevity. Each job 340 may perform the same operations with respect to the third-party service 320. For example, the operations may include download input data 341, extract data 342, process the extracted data 343, and upload the processed data 344. In this example though, the job 340 does not authenticate itself with the third-party service 360. Instead, the host platform creates an ad-hoc proxy 350 which authenticates itself with the third-party service 360. The authentication process may be performed according to any authentication protocol of the third-party service 360 such as using digital signatures, digital keys, MACs, passwords, etc. The result is an authenticated communication channel being established between the ad-hoc proxy 350 and the third-party service 360.

Meanwhile, the job 340 may be isolated together with the ad-hoc proxy 350 within a private network of the host platform. Here, the job 340 may not need to authenticate itself with the third-party service 360 because the job 340 does not access the third-party service 360 directly. Instead, data requests may be transmitted to the ad-hoc proxy 350, first, and the ad-hoc proxy 350 may transmit the data requests to the third-party service 360 via the previously-established authenticated communication channel.

Accordingly, a plurality of instances of the job 340 may simultaneously communicate with the third-party service 360 via the authenticated session and the authenticated communication channel between the ad-hoc proxy 350 and the third-party service 360. In this example though, none of the instances of the job 340 need to perform an authentication with the third-party service 360 because they are simultaneously consuming the established authenticated communication channel between the ad-hoc proxy 350 and the third-party service 360. Therefore, in the same example above, if 100 instances of the job 340 are initiated, only one authentication needs to be performed with the third-party service 360.

Figure 4A:
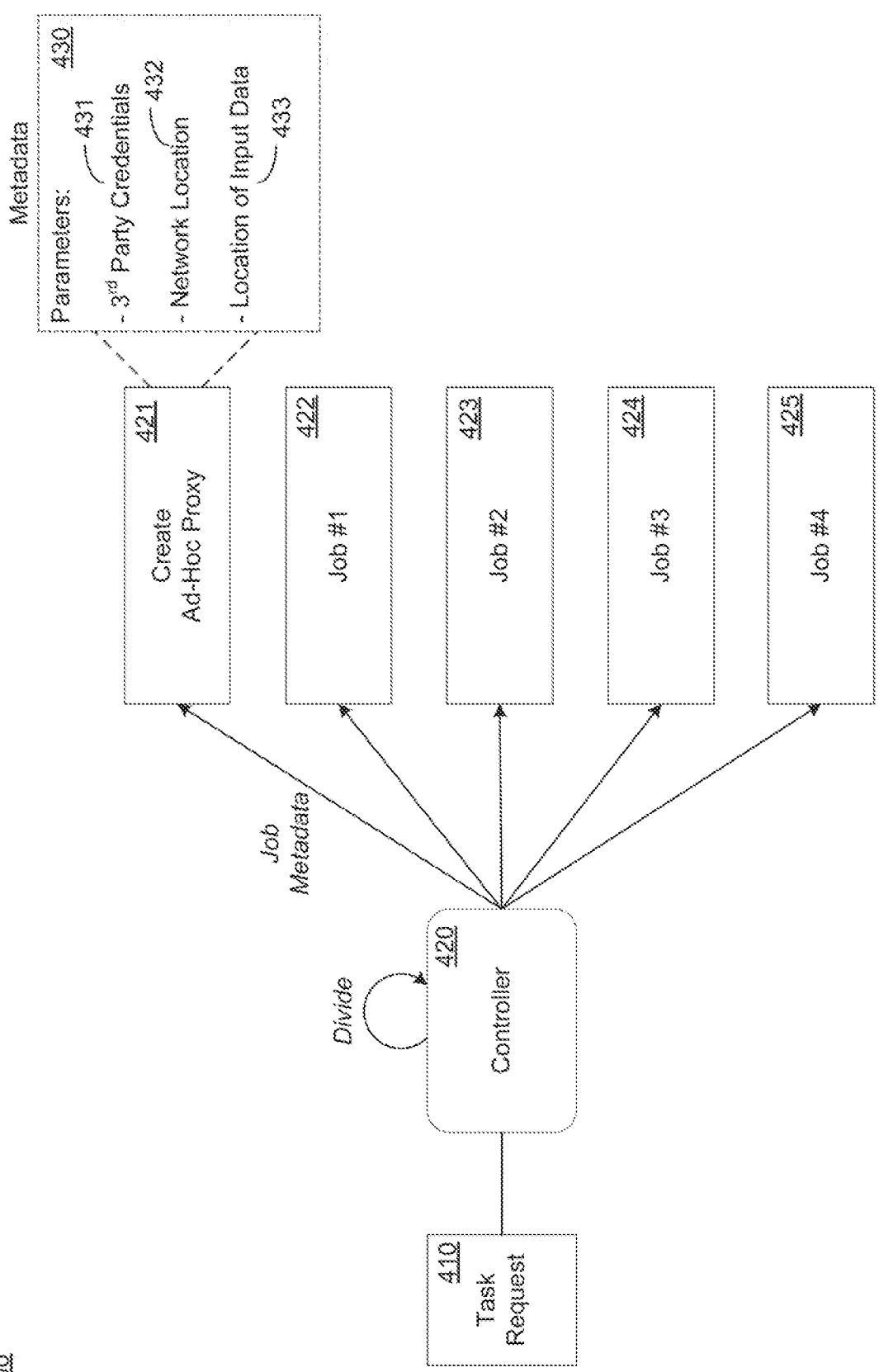
FIG. 4A is a diagram illustrating a process of dynamically creating a proxy for a processing task according to example embodiments.

FIG. 4A illustrates a process 400 of dynamically creating a proxy for a processing task according to example embodiments. Referring to FIG. 4A, when a task request 410 is received by a host platform (not shown), a controller 420 (e.g., a cloud provider, etc.) of the host platform may identify a task that is to be performed based on the task request 410 (e.g., an identifier of the task included in the task request 410, etc.) and create a plurality of jobs 422-425 for performing the task. In this example, the controller 420 creates four jobs 422-425 for processing the task. In addition, the controller 420 also creates an instruction 421 that creates and deploys an ad-hoc proxy node on a host platform according to various embodiments.

For example, the instruction 421 may include instructions for creating a virtual private network, creating the jobs 422-425, and creating the ad-hoc proxy (or multiple ad-hoc proxies). The instruction 421 may also include metadata 430 that includes attributes to be embedded within the ad-hoc proxy node. Here, as an example, the metadata 430 may include authentication credentials 431 for the third-party services, a network location 432 of the third-party services, a location of the input data 433 (e.g., topic ID, partition ID, table name, column name, etc.) of the task data at the third-party service, and the like. The host platform may inject/embed the metadata 430 and the attributes 431-433 into the ad-hoc proxy when the ad-hoc proxy is created or thereafter.

Figure 4B:
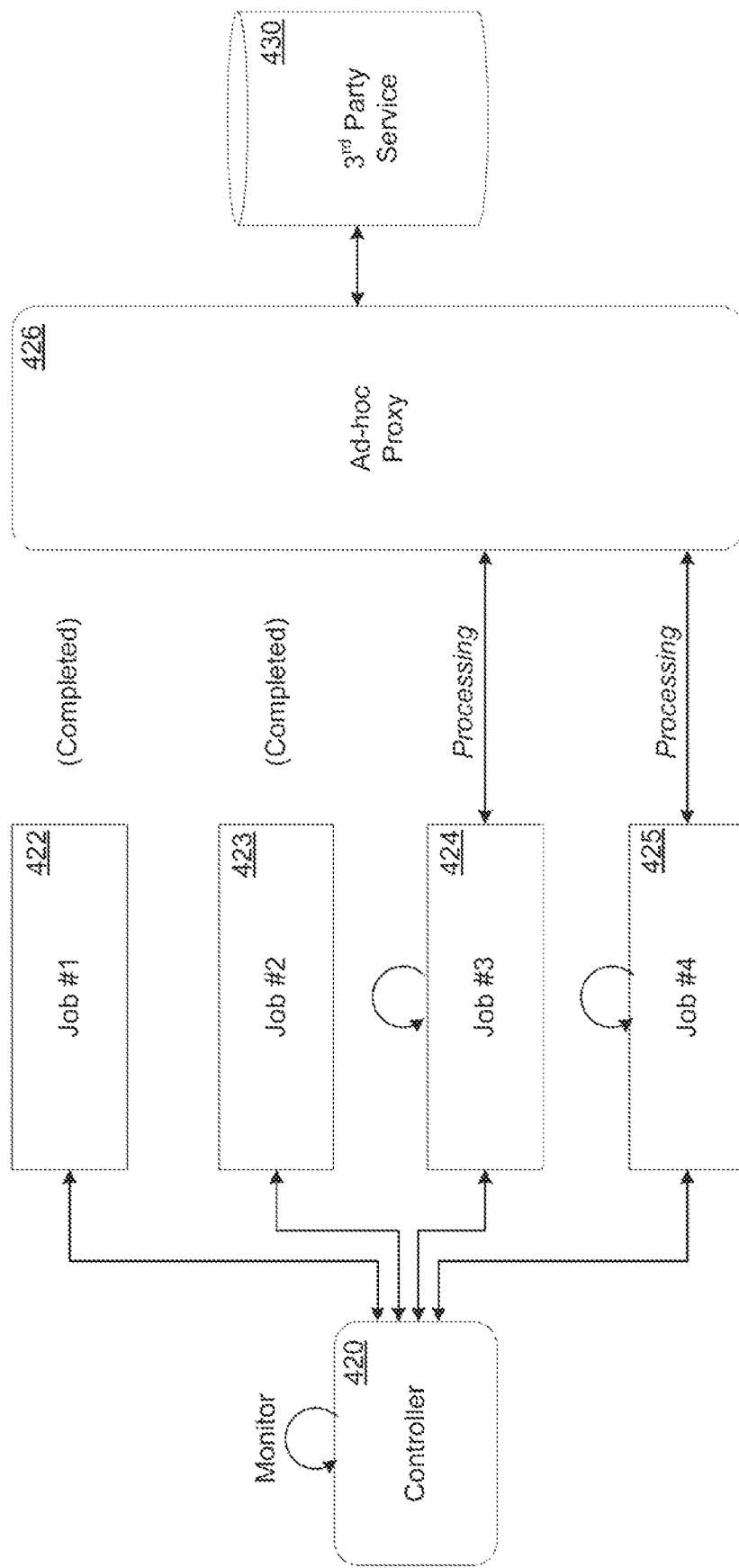
FIG. 4B is a diagram illustrating a process of monitoring the status of jobs of the processing task according to example embodiments.

FIG. 4B illustrates a process 440 of monitoring the status of the plurality of jobs 422-425 of the processing task according to example embodiments. In this example, an ad-hoc proxy 426 has been created based on the instruction 421. Referring to FIG. 4B, the host platform, for example, the controller 420, may monitor the status of each of the jobs 422-425 of the processing task which are interacting with the ad-hoc proxy 426 and identify when the jobs have completed. For example, the controller 420 may monitor download rates, upload rates, bandwidth usage, etc. of a job, to detect when the job has completed. In the example of FIG. 4B, job 422 and job 423 have completed, while job 424 and job 425 are still working.

Figure 4C:
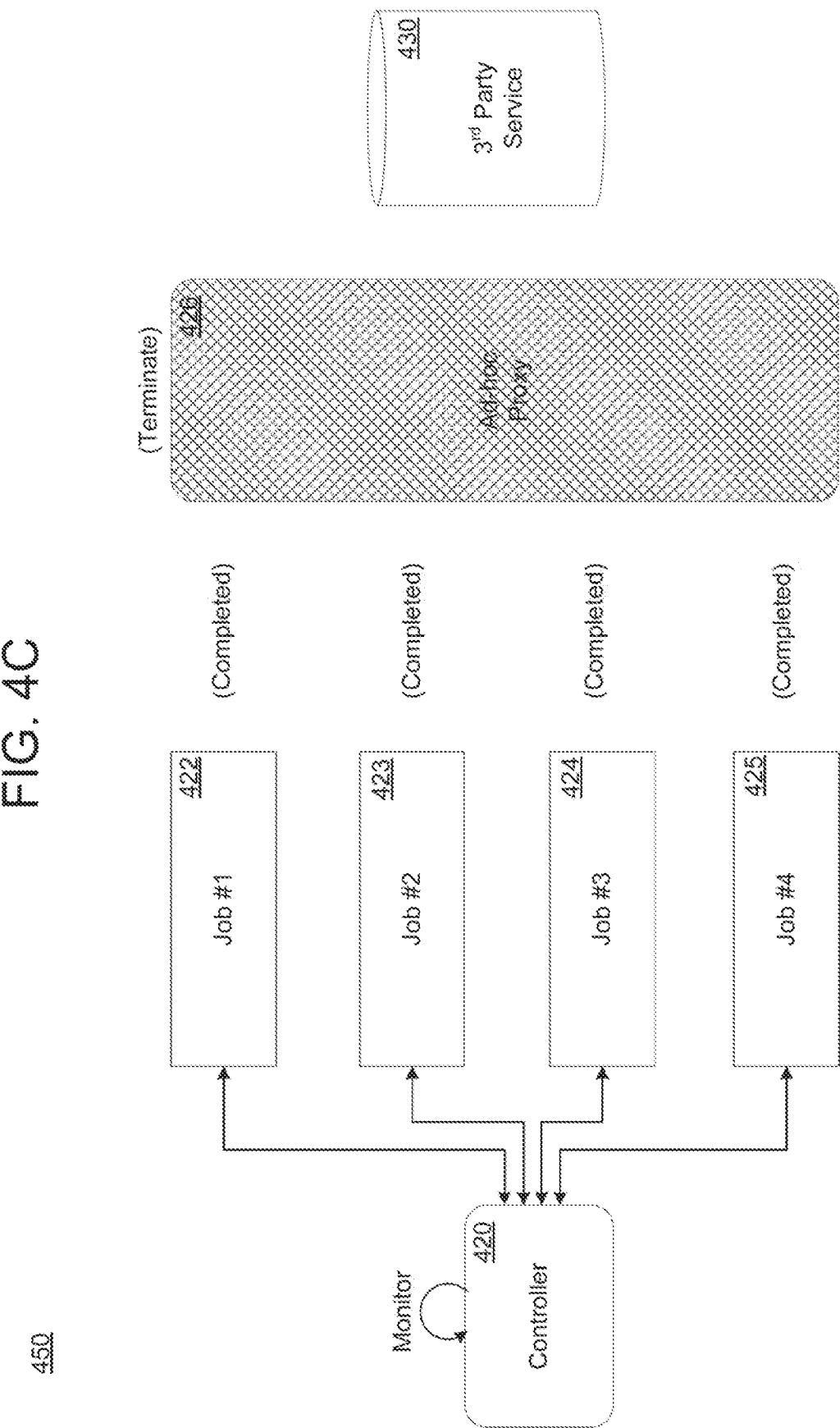
FIG. 4C is a diagram illustrating a process of terminating execution of the proxy of the processing task according to example embodiments.

FIG. 4C illustrates a process 450 of terminating execution of the ad-hoc proxy 426 of the processing task according to example embodiments. Referring to FIG. 4C, the host platform detects that all of the jobs 422-425 have completed processing. In response, the host platform may terminate execution of the ad-hoc proxy 426. For example, the host platform may stop the execution of the ad-hoc proxy and delete the runtime instance of the ad-hoc proxy 426. In addition, although not shown in FIG. 4C, the host platform may also terminate the jobs 422-425 as well as the job data.

FIG. 5 illustrates a method 500 of processing a task with a third-party service via an ad-hoc proxy according to example embodiments. For example, the method 500 may be performed by a host platform such as a cloud platform, a web server, a database node, a distributed computing system, a combination thereof, and the like. Referring to FIG. 5, in 510, the method may include dividing a processing task into a plurality of jobs and executing the plurality of jobs in parallel on a host platform. For example, the processing task may be divided into a plurality of job instances that each perform the same repetitive functions for interacting with a third-party service such as a third-party service.

In 520, the method may include establishing an authenticated communication channel between a proxy of the host platform and a third-party service. For example, the establishing may include performing an authentication between the proxy and the third-party service based on authentication credentials of the third-party service that are programmed in the proxy by the host platform, when the proxy is created. The third-party service may have differing authentication protocols depending on a type/provider of the third-party service. For example, the authentication process may include the exchange of digital signatures, the exchange of keys, the exchange of message authentication codes (MACs), a password, and the like. There is no limit to the types of authentication that can be performed by the proxy described herein. In some embodiments, the method may further include dynamically creating the proxy in response to receiving the processing task. In this example, the dynamically creating may include embedding authentication credentials of the third-party service within the proxy when the proxy is dynamically created.

In some embodiments, the method may include receiving data requests from the plurality of jobs which are executing in parallel on the host platform. In some embodiments, the job instances may be processed on a collection of different nodes, cores, systems, etc. to improve the overall throughput of the processing task as a whole.

In 530, the method may include executing, via the proxy, the data requests for the plurality of jobs via the authenticated communication channel between the proxy and the host platform. In 540, the method may include returning results of the executed data requests to the plurality of jobs. In some embodiments, the executing may include simultaneously executing data processing requests for at least two job instances, respectively, via the authenticated communication channel between the proxy and the host platform. Here, the data processing requests may include the proxy downloading data for the at least two jobs at the same time, uploading data for the at least two jobs at the same time, and the like. In some embodiments, the executing may include simultaneously executing common functions for each of the plurality of jobs via the authenticated communication channel.

In some embodiments, the method further comprises isolating the plurality of jobs and the proxy node within a virtual private network (VPN), wherein the isolating of the plurality of jobs occurs prior to the creation of the proxy. The VPN may encapsulate the proxy node and the plurality of jobs such that other processes on the host platform are unable to access the proxy node or the jobs. In some embodiments, the method may further include detecting that all of the plurality of jobs have completed, and terminating execution of the proxy in response the detection.

Figure 6:
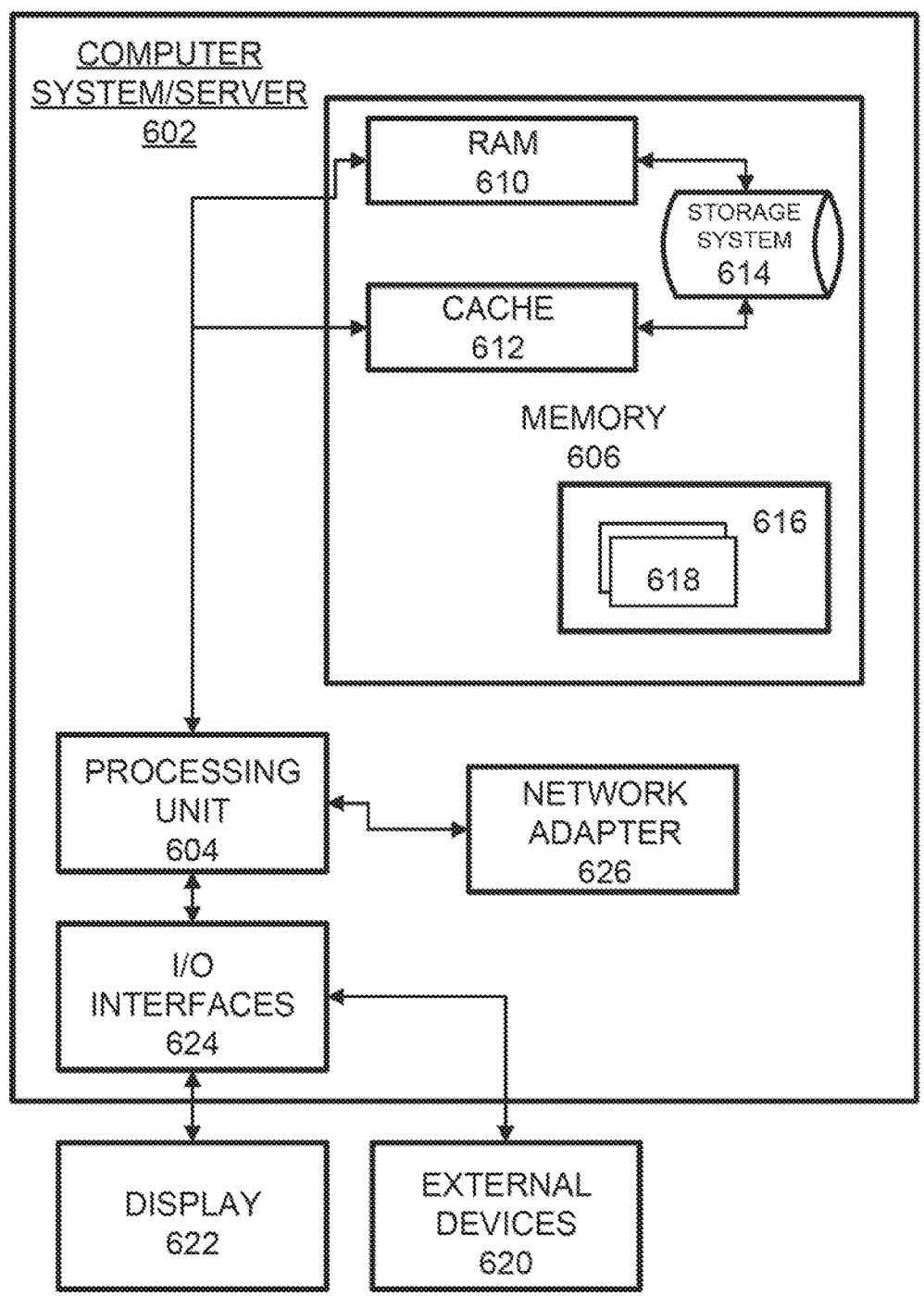
FIG. 6 is a diagram illustrating an example system that supports one or more of the example embodiments.

FIG. 6 illustrates an example system 600 that supports one or more of the example embodiments described and/or depicted herein. The system 600 comprises a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in the system 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, system memory 606 may include at least one program product having a set (e.g., at least one) of program modules that are configured to carry out the functions of various embodiments of the application.

Program/utility 616, having a set (at least one) of program modules 618, may be stored in system memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples include, but are not limited to, microcode, device drivers, redundant processing units, external disk drive arrays, RAID systems, tape drives, and data archival storage systems, etc.

Although an exemplary embodiment of at least one of a system, method, and non-transitory computer-readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
a processor configured to:
 divide a processing task for a target service into a plurality of jobs, wherein each job of the plurality of jobs accesses data from the target service;
 establish an authenticated communication channel between one or more proxies on a host platform and the target service;
 execute, via the one or more proxies, based on the establishment of the authenticated communication channel, the plurality of jobs in parallel;
 simultaneously pull, via the one or more proxies and the established authenticated communication channel, the data from the target service for the plurality of jobs based on the execution of the plurality of jobs, wherein the plurality of jobs simultaneously utilizes the established authenticated communication channel to access the data from the target service, and
the simultaneous utilization includes access of the data by the plurality of jobs at the same time; and
return results of the execution to the plurality of jobs.

2. The system of claim 1, wherein the processor is further configured to dynamically create the one or more proxies to based on receipt of a request for the processing task.

3. The system of claim 2, wherein the processor is further configured to embed an endpoint of the target service and authentication credentials of the target service within each of the one or more proxies at a time at which the one or more proxies are dynamically created.

4. The system of claim 1, wherein the processor is further configured to isolate the plurality of jobs and the one or more proxies within a virtual private network (VPN) on a host platform, wherein the isolation of the plurality of jobs occurs prior to creation of the one or more proxies.

5. The system of claim 1, wherein the processor is further configured to simultaneously execute common operations for the plurality of jobs via the authenticated communication channel.

6. The system of claim 5, wherein the common operations executed by the processor comprise one or more of a read operation from the target service and a write operation to the target service, for each job of the plurality of jobs.

7. The system of claim 1, wherein the processor is further configured to:
detect that each job of the plurality of jobs has completed; and
terminate the one or more proxies, that executed the plurality of jobs, based on the detection.

8. The system of claim 1, wherein the processor is further configured to:
establish a plurality of authenticated communication channels between the one or more proxies and a plurality of target services, wherein the plurality of authenticated communication channels includes the authenticated communication channel; and
access data from the plurality of target services via the plurality of authenticated communication channels established between the one or more proxies and the plurality of target services.

9. A method, comprising:
dividing a processing task for a target service into a plurality of jobs, wherein each job of the plurality of jobs accesses data from the target service;
establishing an authenticated communication channel between one or more proxies on a host platform and the target service;
executing, via the one or more proxies, based on the establishment of the authenticated communication channel, the plurality of jobs in parallel;
simultaneously pulling, via the one or more proxies and the established authenticated communication channel, the data from the target service for the plurality of jobs, based on the executing of the plurality of jobs, wherein the plurality of jobs simultaneously utilizes the established authenticated communication channel to access the data from the target service, and
the simultaneous utilization includes accessing the data by the plurality of jobs at the same time; and
returning results of the execution to the plurality of jobs.

10. The method of claim 9, wherein the method further comprises dynamically creating the one or more proxies based on receipt of a request for the processing task.

11. The method of claim 10, wherein the dynamically creating comprises embedding an endpoint of the target service and authentication credentials of the target service within each of the one or more proxies at a time at which the one or more proxies are dynamically created.

12. The method of claim 9, wherein the method further comprises
isolating the plurality of jobs and the one or more proxies within a virtual private network (VPN) on a host platform, wherein
the isolation of the plurality of jobs occurs prior to creation of the one or more proxies.

13. The method of claim 9, wherein the executing comprises simultaneously executing common operations for the plurality of jobs via the authenticated communication channel.

14. The method of claim 13, wherein the common operations comprise one or more of a read operation from the target service and a write operation to the target service, for each job of the plurality of jobs.

15. The method of claim 9, wherein the method further comprises:
detecting that each job of the plurality of jobs has completed; and
terminating the one or more proxies, that executed the plurality of jobs, based on the detection.

16. The method of claim 9, wherein the establishing of the authenticated communication channel comprises:
establishing a plurality of authenticated communication channels between the one or more proxies and a plurality of target services, wherein the plurality of authenticated communication channels includes the authenticated communication channel; and
accessing data from the plurality of target services via the plurality of authenticated communication channels established between the one or more proxies and the plurality of target services.

17. A non-transitory computer-readable medium comprising instructions, which when executed by a processor, cause the processor to perform:
dividing a processing task for a target service into a plurality of jobs, wherein each job of the plurality of jobs accesses data from the target service;
establishing an authenticated communication channel between one or more proxies on a host platform and the target service;
executing, via the one or more proxies, based on the establishment of the authenticated communication channel, the plurality of jobs in parallel;
simultaneously pulling, via the one or more proxies and the established authenticated communication channel, the data from the target service for the plurality of jobs based on the executing of the plurality of jobs, wherein the plurality of jobs simultaneously utilizes the established authenticated communication channel to access the data from the target service, and
the simultaneous utilization includes access of the data by the plurality of jobs at the same time; and
returning results of the execution to the plurality of jobs.

18. The non-transitory computer-readable medium of claim 17, wherein the instructions further cause the processor to perform dynamically creating the one or more proxies in response to receipt of a request for the processing task.

19. The method of claim 9, wherein the simultaneous pulling of the data comprises downloading input data from the target service at the same time by the plurality of jobs via the established authenticated communication channel.

\* \* \* \* \*